United States Patent [19]

Carter

[11] Patent Number: 4,721,898
[45] Date of Patent: Jan. 26, 1988

[54] WOUND ROTOR MOTOR CONTROL

[75] Inventor: Robert S. F. Carter, Thorold, Canada

[73] Assignee: General Motors Corporation, Detroit, Mich.

[21] Appl. No.: 930,932

[22] Filed: Nov. 17, 1986

[51] Int. Cl.$^4$ ............................................. H02P 7/40
[52] U.S. Cl. ..................................... 318/827; 318/821
[58] Field of Search ................. 318/731, 732, 821–829

[56]  References Cited
U.S. PATENT DOCUMENTS

| 694,105 | 2/1902 | Lindstrom . | |
|---|---|---|---|
| 2,024,713 | 12/1935 | Wickerham . | |
| 2,069,599 | 2/1937 | Brown . | |
| 2,924,765 | 2/1960 | Lee | 318/823 |
| 3,017,554 | 1/1962 | Fischer | 318/828 |
| 3,439,245 | 4/1969 | Perdue | 318/828 |
| 3,657,622 | 4/1972 | Reuland et al. | 318/823 |

Primary Examiner—David Smith, Jr.
Attorney, Agent, or Firm—Robert M. Sigler

[57] ABSTRACT

A control for a wound rotor induction motor including shorting switches in a secondary resistance network comprises an input comparator with voltage limiting switched by the rotor voltage, a pulse generator responsive to the input comparator to generate voltage pulses of predetermined constant duration at a frequency proportional to the frequency of the rectangular voltage wave, a low pass filter effective to filter the output of the pulse generator to a DC voltage inversely related to rotor speed, a DC power supply effective to generate a plurality of DC reference voltages, a plurality of switch control comparators, each receiving the output of the low pass filter on one input and one of the DC reference voltages on the other input and a plurality of switch actuators, each switch actuator being responsive to the output of one of the switch control comparators to activate a group of shorting switches at a predetermined rotor speed during motor acceleration and deceleration. An attenuated signal at the line frequency is substituted, when there is no stator voltage, at the input comparator inputs in the absence of rotor voltage.

5 Claims, 2 Drawing Figures

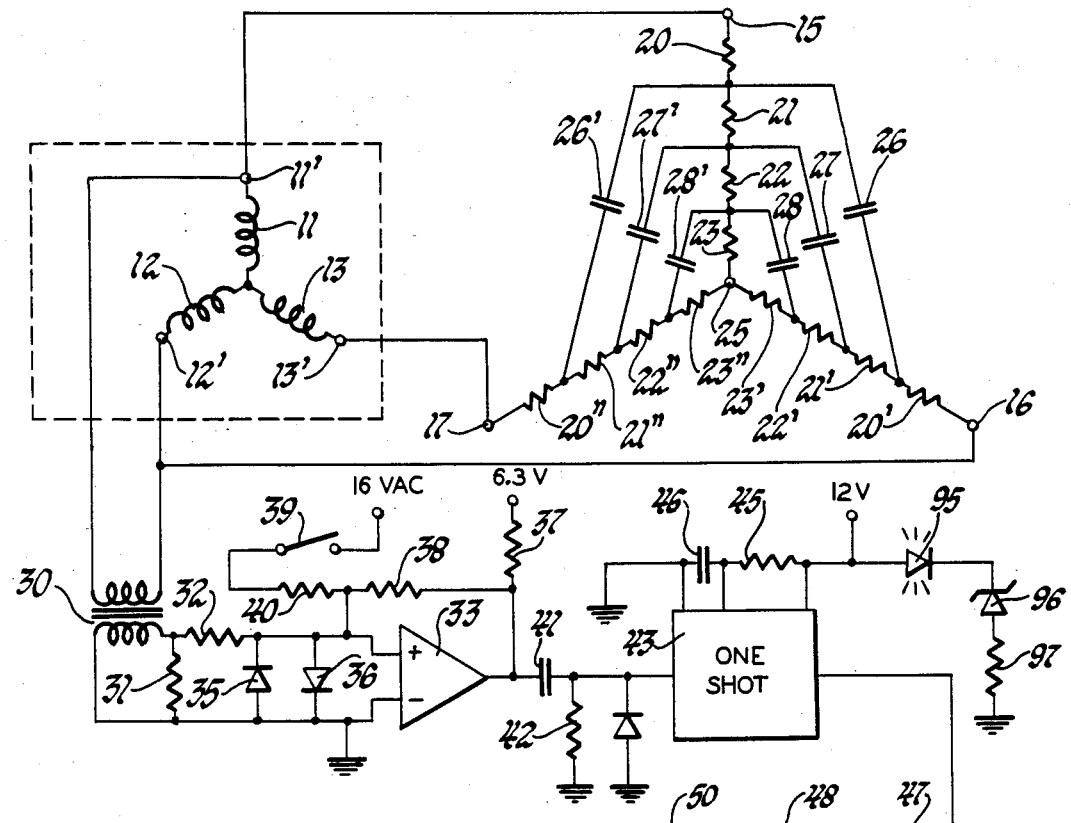
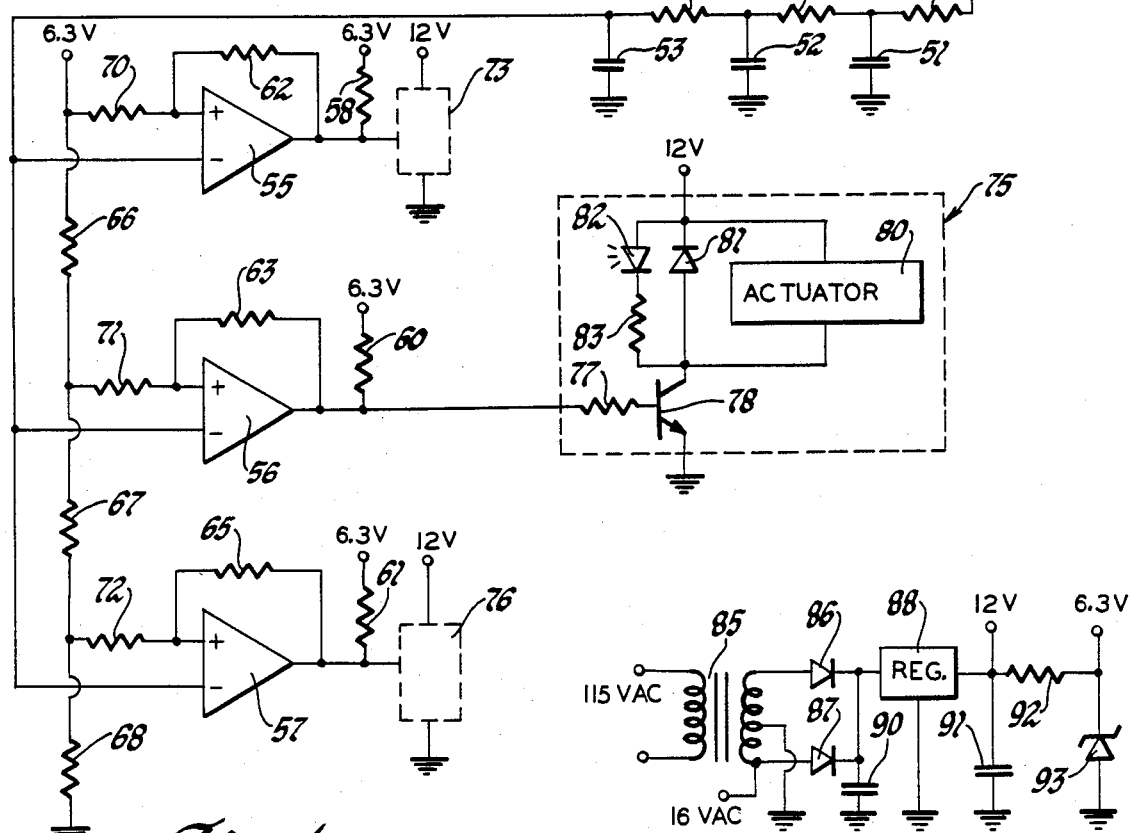
Fig. 1
Fig. 2

WOUND ROTOR MOTOR CONTROL

BACKGROUND OF THE INVENTION

This invention relates to controls for wound rotor AC induction motors, and particularly to such controls for bridge, trolley and hoist applications in crane drives. Such motors are generally provided with three phase rotor windings connected to an external three phase resistive load, the load resistor network including groups of shorting switches or contactors activatable during motor acceleration to progressively short out more of the load in steps as rotor speed increases, and vice versa for deceleration. In the past, this has generally been accomplished by the use of current relays and timers. These devices, however, are subject to maintenance and operator abuse problems, well known to those in the field, which can lead to reduced motor life. For example, the motors can be started under heavy loads or run up against stops or with brakes applied in ways that cause motor current to reach levels much greater than maximum rated current for significant periods of time. Such problems would be minimized if the shorting switches were activated strictly in response to a variable indicating rotor speed.

The prior art has some suggestions along these lines. U.S. Pat. No. 1,118,296 to Lutz, issued Nov. 24, 1914, shows a wound rotor motor control in which an external frequency changer driven by the rotor provides an AC feedback signal having a frequency which varies inversely with rotor rotational speed from line frequency at zero speed to zero frequency at synchronous speed. This is applied to electromagnetically actuated contactors having different magnetic characteristics designed to actuate the contactors at the predetermined rotor speeds. This apparatus, however, is cumbersome, expensive and inflexible. U.S. Pat. No. 2,872,633 to Schurr, issued Feb. 3, 1959, shows a wound rotor motor control in which rotor electrical frequency is used as an indication of rotor speed. This frequency itself varies from line frequency at zero rotor speed to zero frequency at synchronous speed, thus deleting the need for the frequency changer of Lutz. However, the signal is applied to resonant circuits to actuate the contactors; and this is an expensive and inflexible approach.

In addition, the prior art shows no awareness of the similarity in appearance between a loss of the signal voltage indicating rotor speed and a signal voltage of zero frequency indicating synchronous speed. Such a loss of rotor signal, for whatever reason, may cause the prior art controls to short out the entire load resistance, regardless of the actual rotor speed, and therefore deviate from desired control behavior.

SUMMARY OF THE INVENTION

The invention relates to an acceleration and deceleration control for a wound rotor induction motor of the type including an AC powered multi-phase stator and a multi-phase rotor connected to a wye connected secondary having a plurality of shorting switches activatable in groups to decrease the secondary resistance as successive such groups of shorting switches are closed in a predetermined order and increase the secondary resistance as the successive groups are opened in the reverse order. The control comprises an input comparator having an input circuit adapted to receive the rotor voltage and including voltage limiting means across the input comparator inputs effective to limit the rotor voltage applied thereto, a pulse generator responsive to the input comparator to generate voltage pulses of predetermined constant duration at a frequency proportional to the frequency of the rectangular voltage wave and a low pass filter effective to filter the output of the pulse generator and thus generate a DC voltage inversely related to rotor speed.

It further comprises a DC power supply effective to generate a plurality of DC reference voltages, a plurality of switch control comparators, each receiving the output of the low pass filter on one input and one of the DC reference voltages on the other input, and a plurality of switch actuators, each switch actuator being responsive to the output of one of the switch control comparators to activate one of the groups of shorting switches to close the shorting switches in the predetermined order as rotor speed increases during acceleration and open the shorting switches in the reverse order as rotor speed decreases during motor deceleration.

In addition, it may comprise circuit elements effective to provide across the inputs of the input comparator, in the absence of a rotor voltage thereacross, an AC voltage at the line frequency, whereby the shorting switches may be kept open when the control is powered and the stator is not. The voltage at the line frequency may be provided only in the absence of a stator voltage, whereby the shorting switches are not opened when the motor achieves synchronous speed. Further details and advantages of the invention will be apparent from the accompanying drawings and following description of a preferred embodiment.

SUMMARY OF THE DRAWINGS

FIG. 1 is a circuit diagram of a control according to this invention.

FIG. 2 is a diagram of a power supply circuit for the circuit of FIG. 1.

DESCRIPTION OF A PREFERRED EMBODIMENT

Referring to FIG. 1, a wound rotor AC induction motor 10 of standard construction is identified by the dashed line block. Motor 10 includes a three phase stator, not shown, and a three phase secondary comprising windings 11, 12 and 13 connected in a wye configuration. The phase winding terminals 11', 12' and 13' of windings 11, 12 and 13, respectively, are connected to terminals 15, 16 and 17 of a switched resistor load network 18. Network 18 comprises groups of resistors connected in a wye configuration. Resistors 20, 20' and 20" have one end each connected to terminals 15, 16 and 17 respectively. Resistors 21, 21' and 21" have one end each, respectively, connected to the other ends of resistors 20, 21' and 21". Similarly, resistors 22, 22' and 22" form another concentric group; and resistors 23, 23' and 24" complete the network with their other ends connected together at center terminal 25. A plurality of shorting switches or contactors 26, 26', 27, 27', 28, 28' are provided across the junctions of the resistors as shown so that the resistors might be shorted out in concentric groups during motor acceleration. For example, shorting switch 26 is connected from the junction of resistors 20 and 21 to the junction of resistors 20' and 21' Likewise, shorting switch 26' is connected from the junction of resistors 20 and 21 to the junction of resistors 20" and 21". Shorting switch 26 is normally open but may be closed to short out resistors 21, 22, 23, 23', 22' and 21' so that only resistors 20 and 20' appear in the circuit between terminals 15 and 16. Likewise, shorting switch 26' is normally open but may be closed to short out all but resistors 20 and 20" between terminals 15 and 17. If both shorting switches 26 and 26' are closed simultaneously, which they are in practice, they together short out all but resistors 20' and 20" between terminals 16 and 17 to complete the multi-phase load reduction. Likewise, shorting switches 27 and 27' form a second concentric group between the junctions of resistors 21 and 22 and their primes; while shorting switches 28 and 28' form a third concentric group between the junctions of resistors 22 and 23 and their primes, as shown in FIG. 1.

The wound rotor motor with its load resistor network and shorting switches or contactors is well known in the prior art. In practice, the motor is started with all shorting switches open for maximum load resistance. As the motor accelerates, the concentric groups of contactors are closed one at a time, starting with 28 and 28'. This decreases the load resistance one step at a time to allow smooth acceleration without overloading the motor, if the switches are closed at the correct motor speeds.

In this embodiment, the total resistance of the resistors 20, 21, 22 and 23 is divided 12.5% for resistor 20, 12.5% for resistor 21. 25% for resistor 22 and 50% for resistor 23 (and similarly for the primed and double primed reference resistors of the same numbers). With a 15 horsepower motor, a locked rotor voltage of 200 volts and a full load rotor current of 30 amps, the full rotor resistance is 3.849 ohms, which is divided as specified above. For a bridge drive application, the shorting switches are to be closed, in order, at 58 Hz, 30 Hz and 15 Hz. Switches 28 and 28' are closed at 58 Hz rather than 60 Hz to ensure that the motor and its load are in motion, out of a stalled condition, before the first decrease in load resistance occurs, thus avoiding a possible 200% load current during stall with resultant overheating.

For trolley drives, which have no brake and rely on plugging torque for stopping, the switching frequencies are different: 75 Hz, 45 Hz and 30 Hz. These give better plugging torque when the trolley is almost stopped. Although stall current will be greater than full rated load current, this is not as serious a situation as in bridge drives, since there is no brake to hold the trolley stalled for long periods of time. The trolley pattern is set up for good plugging and low acceleration, which facilitate well controlled load swinging. To compensate for the possible 160% rated load current at stall, the resistors are rated to carry 150% full rated current continuously. The bridge drive resistors need only carry 100% continuously.

Returning to FIG. 1, two rotor terminals, such as terminals 11' and 12', are connected to the primary of a step down transformer 30, the secondary of which is connected across a resistor 31 (10K, 1W). An AC low pass filter, not shown, may be included between the secondary of transformer 30 and resistor 31 to filter out power line harmonics of 120 Hz or higher, which might otherwise interfere with proper circuit operation as the rotor voltage becomes small near synchronous motor speed.

One end of resistor 31 is connected through a resistor 32 (10K, 1W) to the non-inverting input of a comparator 33 having an inverting input connected to the other end of resistor 31. A pair of voltage limiting diodes 35 and 36 are placed across the inputs of comparator 33 facing opposite directions, whereby the rotor voltage, which varies greatly with rotor speed, is limited for protection of comparator 33. The output of comparator 33 is connected through a tie-up resistor 37 to a regulated 6.3 volt source to be described with reference to FIG. 2. The output is also connected back in positive feedback to the non-inverting input through a resistor 38 (1 M). The non-inverting input of comparator 33 is further connected through a switch 39 and resistor 40 (470K) to a 16VAC source to be described with reference to FIG. 2. Thus the rotor voltage is summed with a greatly attenuated 60 Hz signal at the non-inverting input to comparator 33. When rotor voltage is present, the 60 Hz signal results in nothing more than a slight ripple on that signal at the input of comparator 33, which ripple is filtered out by the comparator. However, when no rotor voltage is present and switch 39 is closed, the 60 Hz signal from the 16VAC source substitutes at the input to comparator 39 and results in a signal indicating zero rotor speed. This is clearly useful in case of loss of rotor voltage to comparator 33 due to malfunction. In addition, there is a benefit in normal operation which cannot be adequately explained until the remainder of the circuit is described.

The output of comparator 33 is a square wave voltage signal of substantially constant amplitude and a frequency which corresponds to rotor electrical frequency, which varies inversely with rotor speed. This signal is passed through a differentiating high pass filter, comprising a series capacitor 41 (0.01 µF) with a resistor 42 (10K) to ground, to the input of a one shot multivibrator 43, the high pass filter passing a narrow positive or negative pulse for each leading or trailing edge, respectively, of the rectangular wave. The input to one shot 43 is also connected to the cathode of a diode having a grounded anode, which diode passes all negative pulses to ground and passes the positive pulses only to one shot 43.

One shot 43 (MC14538B) uses a resistor 45 and capacitor 46 (1 µF) to determine the constant duration of its output pulses, one of which is triggered for each input pulse. It is powered from a regulated 12 volt source to be described with reference to FIG. 2. The constant duration output pulses of one shot 43, occurring at the variable electrical frequency of the rotor of motor 10, forms a rectangular voltage signal with a duty cycle varying with that frequency and thus inversely with the rotor speed of motor 10. This signal is filtered to a DC voltage varying with the duty cycle by a low pass filter comprising series resistors 47 (1K), 48 (10K) and 50 (10K) and capacitors 51 (100 µF), 52 (1 µF) and 53 (1 µF). This DC voltage is a rotor speed signal for motor 10 in useful form for operating shorting switches 26-28'.

The filtered output of one shot 43 is provided to the inverting inputs of comparators 55, 56 and 57. Comparators 55, 56 and 57 have outputs connected to the 6.3 volt source through tie-up resistors 58, 60 and 61 (all 3K), respectively, and back to the respective non-inverting input through feedback resistors 62 (0.1 M), 63 (62K) and 65 (50K), respectively. A reference voltage divider comprises resistors 66 (240), 67 (120) and 68 connected in series between the 6.3 volt source and ground. The 6.3 volt source is connected through a resistor 70 (1K) to the non-inverting input of comparator 55 to provide a 6.3 volt reference to that comparator. The junction of resistors 66 and 67 is provided through a resistor 71 (1K) to the non-inverting input of comparator 56 to provide a lower reference voltage to that comparator. Finally, the junction of resistors 67 and 68 is connected through a resistor 72 (1K) to the non-inverting input of comparator 57 to provide the lowest reference voltage to that comparator. Resistor 68 is calibrated to produce the frequency switching range desired for a particular application.

The outputs of comparators 55, 56 and 57 are connected to switch actuating circuits 73, 75 and 76, respectively, indicated by dashed line boxes. To save space, only switch actuating circuit 75 is shown in detail; the others are identical. The output of comparator 56 is connected, in switch actuating circuit 75, through a resistor 77 to the base of an NPN transistor 78 having a grounded emitter. The collector of transistor 78 is connected through the actuator 80 of shorting switches 27 and 27′ to the 12 volt source. In parallel with actuator 80, which is, in this embodiment, the coil of a relay and therefore an inductive load for transistor 78, is a freewheeling diode 81. Also in parallel with actuator 80 may be an indicating LED 82 in series with a resistor 83 (470) to provide visual indication of shorting switch actuation, if desired.

The power supply for the apparatus is shown in FIG. 2. A 115 volt AC source is connected across the primary of a transformer step down transformer 85 having a center tapped secondary with the tap grounded. The ends of the secondary winding are connected through diodes 86 and 87 to the input of a 12 volt regulator 88, which input is also connected to ground through a 1000 μF capacitor 90. The junction of one end of the secondary winding of transformer 85 and the anode of diode 87 is tapped as the 16 volt source mentioned above. The output of the 12 volt regulator is connected to ground through a capacitor 91 (0.1 μF) and tapped as the regulated 12 volt source mentioned above. It is further connected through a resistor 92 (100) and a 6.3 volt zener diode 93 to ground, the cathode of the zener diode 93 serving as the 6.3 volt source.

A power supply indicating circuit is shown in part of FIG. 1. From the 12 volt regulated source, an LED 95, a zener diode 96 and a resistor 97 (280) are connected in series to ground. LED 95 lights whenever power is available from the power supply shown in FIG. 2 to serve as an on/off indicator for the circuit.

The role of the 60 Hz AC signal to the non-inverting input of comparator 33 can now be described. When power is supplied to the power supply of FIG. 2 and the motor has not yet been started, there is no rotor voltage as yet to be applied to comparator 33; and, in the absence of the added 60 Hz signal through resistor 40, the shorting switches would all be closed. This makes no difference when the motor is not operated; and when the motor is operated the rotor voltage will be supplied to open the shorting switches. However, the motor would start with the shorting switches closed; and a propagation delay through the control would occur before the rotor voltage appearing at the input to comparator 33 could open them. Therefore, the 60 Hz signal may be applied to comparator 33 before the motor is started to ensure that the shorting switches start open for maximum starting secondary load resistance.

However, in certain applications, such as a hoist going down or a long horizontal run with the wind, the motor may be pushed by outside forces to synchronous speed. If this occurs, the rotor voltage and frequency go to zero; and, if switch 39 is closed, the 60 Hz signal may take over and open all the shorting switches. This is undesirable, since the increase in load resistance will decrease torque and the motor will slow, thus leading to an oscillation about synchronous speed. Therefore, switch 39 may be controlled by stator voltage to be open when stator voltage is detected and closed when stator voltage is not detected. Thus the 60 Hz signal from the 16VAC source will be supplied through resistor 40 to comparator 33 when power is applied to the circuit before motor operation is begun to prevent the shorting switches from opening. As soon as power is supplied to the motor stator, switch 39 is opened. However, rotor voltage at 60 Hz is immediately generated and applied to the inputs of comparator 33 through transformer 30. The beginning of this signal is propagated through the control along with the end of the other 60 Hz signal so that the former replaces the latter smoothly with no loss of AC signal in motor startup.

The embodiments of the invention in which an exclusive property or privilege is claimed are defined as follows:

1. An acceleration and deceleration control for a wound rotor induction motor of the type including an AC powered multi-phase stator and a multi-phase rotor connected to a wye connected secondary having a plurality of shorting switches activatable in groups to decrease the secondary resistance as successive such groups of shorting switches are closed in a predetermined order and increase the secondary resistance as the successive groups are opened in the reverse order, the control comprising, in combination:

an input comparator having an input circuit adapted to receive the rotor voltage and including voltage limiting means across the input comparator inputs effective to limit the rotor voltage applied thereto, the input comparator thereby generating an amplitude limited rectangular voltage wave at the frequency of the rotor voltage;

a pulse generator responsive to the input comparator to generate voltage pulses of predetermined constant duration at a frequency proportional to the frequency of the rectangular voltage wave;

a low pass filter effective to filter the output of the pulse generator and thus generate a DC voltage inversely related to rotor speed;

a DC power supply effective to generate a plurality of DC reference voltages;

a plurality of switch control comparators, each receiving the output of the low pass filter on one input and one of the DC reference voltages on the other input; and a plurality of switch actuators, each switch actuator being responsive to the output of one of the switch control comparators to activate one of the groups of shorting switches to close the shorting switches in the predetermined order as rotor speed increases during acceleration and open the groups of shorting switches in the reverse order as rotor speed decreases during motor deceleration.

2. The control of claim 1 wherein the motor is powered from an AC source at a line frequency, the control further including circuit elements effective to provide across the inputs of the input comparator, in the absence of a rotor voltage thereacross, an AC voltage at the line frequency, whereby the shorting switches may be kept open when the control is powered and the stator is not.

3. The control of claim 2 wherein the AC voltage at the line frequency is provided only in the absence of a stator voltage, whereby the shorting switches are not opened when the motor achieves synchronous speed.

4. An acceleration and deceleration control for a wound rotor induction motor of the type including an AC powered multi-phase stator powered at a line frequency and a multi-phase rotor connected to a wye connected secondary having a plurality of shorting switches activatable in groups to decrease the secondary resistance as successive such groups of shorting switches are closed in a predetermined order and increase the secondary resistance as the successive groups are opened in the reverse order, the control comprising, in combination:

an input comparator having an input circuit adapted to receive the rotor voltage and including voltage limiting, parallel, oppositely directed diodes across the input comparator inputs effective to limit the rotor voltage applied thereto, the input comparator thereby generating an amplitude limited rectangular voltage wave at the frequency of the rotor voltage;

a differentiator effective to generate transition pulses at the transitional points of the rectangular voltage wave from the input comparator and including unidirectional pulse suppression means for suppressing all transition pulses from the differentiator of a first polarity and passing all transition pulses from the differentiator of a second polarity;

a pulse generator responsive to the differentiator to generate, for each transition pulse of the second polarity, a voltage pulse of predetermined constant duration, whereby such voltage pulses occur at the frequency of the rectangular voltage wave;

a low pass filter effective to filter the output of the pulse generating means and thus generate a DC voltage inversely related to rotor speed;

a DC power supply effective to generate a plurality of DC reference voltages;

a plurality of switch control comparators, each receiving the output of the low pass filter on one input and one of the DC reference voltages on the other input;

a plurality of switch actuators, each switch actuator being responsive to the output of one of the switch control comparators to activate one of the groups of shorting switches to close the shorting switches in the predetermined order as rotor speed increases during acceleration and open the groups of shorting switches in the reverse order as rotor speed decreases during motor deceleration; and circuit elements effective to provide an AC voltage wave at the line frequency and smaller in amplitude than the rotor voltage to one of the input comparator inputs, whereby the shorting switches may be kept open when the control is powered and the stator is not.

5. The control of claim 4 further including switch means responsive to the presence of a stator voltage to provide the AC voltage at the line frequency only in the absence of a stator voltage, whereby the shorting switches are not opened when the motor achieves synchronous speed.

* * * * *